Aug. 18, 1964 B. L. ROMVARI 3,145,331

DETENT SERVO SYSTEM

Filed Aug. 24, 1960 3 Sheets-Sheet 1

INVENTOR.
BELA L. ROMVARI
BY Edward M. Fessell
ATTORNEY

INVENTOR.
BELA L. ROMVARI
BY Edward M. Farrell
ATTORNEY

Aug. 18, 1964 B. L. ROMVARI 3,145,331

DETENT SERVO SYSTEM

Filed Aug. 24, 1960 3 Sheets-Sheet 3

INVENTOR.
BELA L. ROMVARI
BY
Edward M. Farrell
ATTORNEY 3,145,331

DETENT SERVO SYSTEM

Bela L. Romvari, Philadelphia, Pa., assignor to Sperry Rand Corporation, New York, N.Y., a corporation of Delaware Filed Aug. 24, 1960, Ser. No. 51,750
5 Claims. (Cl. 318—28)

This invention relates to servo systems, and more particularly to servo systems for rapidly positioning a magnetic head carrying carriage to a selected track on a magnetic drum.

In various magnetic head positioning systems involving a magnetic drum, it is desirable to rapidly and accurately position a magnetic head over a selected information track of a magnetic drum prior to starting a reading or writing operation. In many such systems, three separate coordinated servo control operations may be employed. The first servo operation may roughly position the carriage, for example, within a certain distance of the center between two selected teeth of a positioning rack. This rough positioning, for example, may involve selection of a group of 10 or 20 information tracks from as many as 2,000 tracks on the magnetic drum, the distance between two teeth being equal to the distance occupied by the 10 or 20 tracks.

At the same time, or following in sequence, a second servo operation may be a fine positioning operation which may involve the use of a lever adder. Such a servo operation and lever adder is described in a co-pending patent application entitled "Lever Adder," Serial No. 10,374, filed on February 23, 1960 by H. F. Welsh, and assigned to the same assignee as the present invention. The lever adder or other suitable means made operative during the second servo operation, is adapted to move the positioning rack a number of discrete distances corresponding to the number of tracks between two teeth of the rack. The exact distance moved is dependent upon the track to be selected.

The third servo operation is employed to place and hold the head carrying carriage at a fixed position against one of the teeth of the rack to thereby hold the head carrying carriage over the selected track. During the third servo control operation, a pawl is forced against one selected tooth of the positioning rack and a small amount of torque is provided to maintain the pawl at this position. This third servo control operation is the subject of the present patent application. The aforementioned copending patent application describes one type of system with which the present invention may be employed.

In the system, such as the one described in the aforementioned patent application and other similar systems, after the first two servo operations has resulted in a carriage being positioned between two selected teeth of the positioning rack, a zero error detector circuit is generally operated to disconnect the various voltages which are normally applied to drive the servo mechanisms during the positioning operations. The positioning voltage generally used to drive the servo mechanisms to position the carriage includes an error positioning voltage which is representative of the position of a carriage and the position being sought by the carriage while moving. A second voltage, generally the output of a tachometer, is representative of the velocity of the carriage and is used for damping the movement of the carriage as it approaches close to its selected position. The error positioning and velocity voltages are combined in phase opposition to permit the velocity voltage to provide damping of the carriage movement.

After the carriage is positioned between two selected teeth of a positioning rack, as after the second servo operation, the carriage must still travel a relatively short distance before reaching its final position. After the carriage has settled down, a pawl, or other suitable means associated with the carriage, should be moved against one of the teeth of the rack and exert a small amount of force, in the order of 12 to 14 ounces, for example, against the selected tooth. This force maintains the carriage at the selected position while subsequent operations, such as reading or writing, are being performed.

In order to avoid excess wear of the various mechanical parts associated with the positioning mechanism, the speed of a pawl associated with the carriage should be safely limited so that it does not hit the side of the selected tooth with too great a force. At the same time, it is desirable to move the pawl and carriage with sufficient speed to attain the final position of the carriage as quickly as possible.

It is an object of this invention to provide a servo system in which a final position of a carriage during a positioning operation is reached quickly and efficiently.

It is a further objective of this invention to provide means for positioning a carriage mechanism to a final position while minimizing the likelihood of damage to mechanical parts resulting from too great a speed.

It is still a further object of this invention to provide the aforementioned objects while using a low carrier frequency and without the need of an error positioning signal during the final positioning operation of a carriage.

In accordance with the present invention, a servo system for positioning a magnetic head carrying carriage with respect to a positioning rack is provided. A pawl mechanism is associated with the carriage and is disposed to engage one of the teeth of the rack when it is in an extended position and to be free of the rack when it is in a retracted position. A motor, operative by a source of driving voltage, causes the pawl to move against one of the teeth of the rack when the pawl is in an extended position. After a predetermined time, while the pawl is being moved, a velocity voltage is combined with the driving voltage to provide damping of the movement of the pawl. After the pawl strikes the selected tooth, the motor provides a small torque to maintain the pawl against the selected tooth.

Other objectives and events of the present invention will be apparent and suggest themselves to those skilled in the art to which the present invention is related, from a reading of the following claims in conjunction with the accompanying drawing in which:

FIGURE 1*a* is a chart illustrating positioning and damping voltages, in connection with a pawl and rack arrangement, in accordance with the present invention;

FIGURE 1*b* includes waveforms illustrating various voltages, being plotted as voltage versus distance, presented for the purpose of describing the present invention;

FIGURE 1*c* is waveforms, illustrating error voltage versus time, presented for purposes of explanation;

Figures 1A, 1B, 1C:
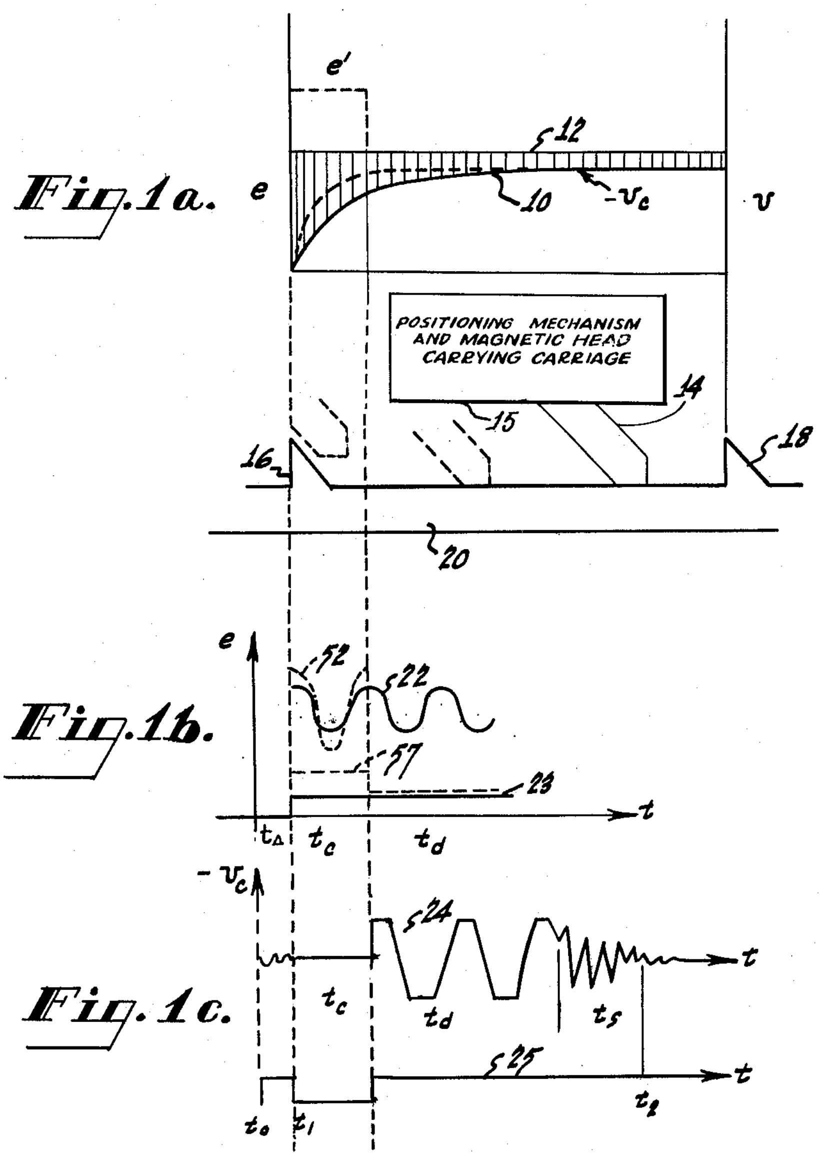

In considering FIGURES 1*a*, 1*b* and 1*c*, the various positions of the waveforms illustrated are related to the position to the rack and teeth illustrated in FIGURE 1*a*.

Referring particularly to FIGURE 1*a*, a curve 10 representing a velocity voltage, which may be present in the system at the time that a pawl 14 is disposed between two teeth 16 and 18 of a positioning rack 20. A curve 12 represents the constant positioning voltage. An area between curves 12 and 10 represents an error voltage, which may be present in the system when the pawl 14 is disposed between the two teeth 16 and 18.

The pawl 14 may be connected to a mechanism 15, which may include the positioning mechanisms and magnetic head carrying carriage. The details of such a mechanism are well known to those skilled in the art. A description of one such positioning mechanism with which the present invention may be employed may be found in a copending patent application of H. F. Welsh, Serial Number 39,406, filed June 28, 1960, entitled "Protective Release Mechanism" and assigned to the same assignee as the present invention. An example of the magnetic head which may be suitably connected by means of a pulley or other suitable means to the positioning mechanism may be found in another co-pending application of F. X. Kanamuller, Serial Number 5,873, filed, February 1, 1960 entitled "Magnetic Head Positioning System," and assigned to the same assignee as the present invention.

Referring to FIGURE 1*b*, a waveform 22 represents a driving voltage for driving the pawl 14 against the tooth 18 and maintaining it in that position. A waveform 23 represents a gating signal.

Referring to FIGURE 1*c*, a waveform 24 represents a velocity voltage and a waveform 25 represents a gating signal. The significance of the various waveforms illustrated will be seen more clearly when the subsequent figures are described.

Figure 2:
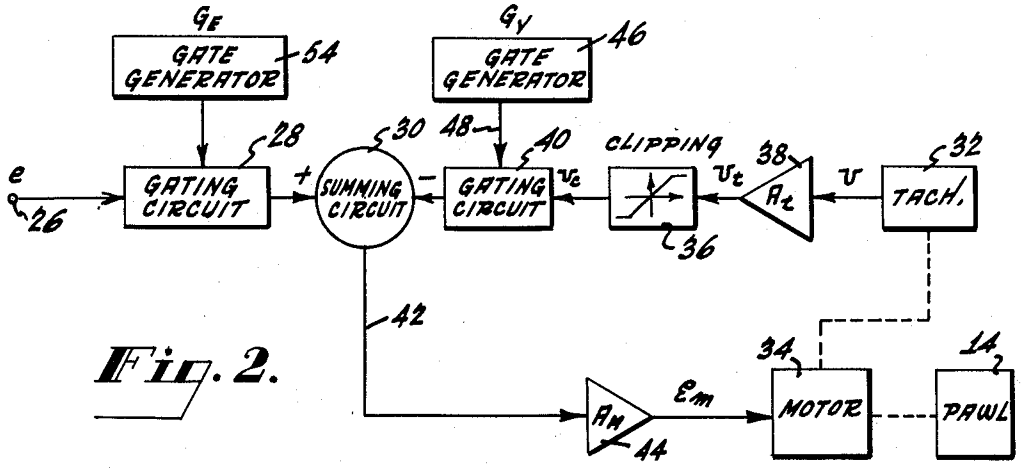
FIGURE 2 is a block diagram illustrating the present invention.

Referring particularly to FIGURE 2, a driving voltage such as represented by the curve 22 in FIGURE 1*b*, is applied from an input terminal 26 through a gate circuit 28 to a summing circuit 30.

A tachometer 32 is associated with a driving motor 34 to develop a velocity voltage. The velocity voltage is applied to a clipping circuit 36 through an amplifier 38. The output voltage from the clipping circuit 36 is also applied to the summing circuit 30 through a gating circuit 40. The polarity of the voltage on the gating circuit 40 is opposite in phase from the voltage developed at the gating circuit 28.

A voltage, representative of the difference between the voltages from the gating circuit 28 and 40, is developed at the output line 42 of the summing circuit 30. The voltage at the line 42 is applied through an amplifier 44 to drive the motor 34. The motor 34 produces a torque to urge the pawl 14 against the tooth 18 (FIG. 1*a*) and to maintain the pawl at a set position.

In considering the block diagram of FIGURE 2, it is assumed that the rough positioning of the pawl 14 has been completed, and that the fine positioning of the rack has been completed during the lever adder operation. The third kind of operation is about to commence. This third operation involves the movement and holding of the pawl 14 against the selected tooth 18 of the positioning rack.

In order to achieve fast final positioning, of the pawl, it is desirable that a maximum amount of the voltage drive the motor 34 especially at the start of the operation after the pawl is extended between two proper teeth and ready to engage the selected tooth. Consequently, a damping voltage, as provided by a velocity voltage, is not necessary at the beginning of the third or reverse servo operation. At the beginning of the third operation it is desirable that only the driving voltage from the gating circuit 28 be applied to the summing circuit 30 without a damping signal to drive the motor 34. A gate generator circuit 46 is used to produce a gate signal at the line 48 to inhibit the gating circuit 40 for a predetermined period of time. During this period, no velocity voltage is applied to the summing circuit 30. Consequently a maximum acceleration voltage is applied to the motor 34 to quickly drive the pawl 14 against the tooth 18.

After the motor 34 and the pawl 14 have reached a maximum speed which is maintained for a predetermined period of time, it is desirable to provide damping to minimize the likelihood of damage which may result if the pawl 14 strikes against the tooth 18 with too high a force.

After a predetermined period of time after which it is desired to use a damping signal, the inhibitory signal at the line 48 is removed to permit a velocity signal to pass from the clipping circuit 36 through the gating circuit 40 to the summing circuit 30. When this occurs, the driving voltage at the input terminal 26 is combined with the velocity voltage developed by the tachometer 32.

The gating signal applied from the gate generator circuit 46 to the gating circuit 40 is represented by the waveform 25 of FIGURE 1*c*. It may be seen from the waveforms 22 and 24 that after a predetermined period of time, a maximum velocity voltage from the clipping circuit 36, i.e., waveform 24, is applied to the summing circuit 30.

In the embodiment illustrated, a maximum acceleration during the initial period of operation, designated $t_c$, is achieved by inhibiting the velocity damping voltages. After the pawl 14 hits the tooth 18, maximum damping must be provided. It is noted that after damping signal 24 drops below a certain value, as determined by the clipping circuit 36, the velocity voltage is no longer limited. The time that the velocity voltage is limited is designated $t_d$. Consequently, during the "settling down" period of the pawl 14, designated $t_s$, a maximum damping voltage is applied to the summing circuit 30. This results in the pawl 14 coming to a rest position in a minimum amount of time.

In some systems it may be desirable to provide a driving voltage, as represented by the curve 22 of FIGURE 1*b*, at a higher than normal amplitude for a short period of time to achieve maximum acceleration of the pawl at the beginning of the third servo operation. This higher amplitude is illustrated by a dotted curve 52 and may be applied to a system for a period of time designated as $t_c$. If this type of operation involving higher amplitude driving voltage is desired, an additional gating circuit 54 provides a gating signal 57 to permit the gate circuit 28 to pass a larger signal voltage for the time period designated $t_c$. A driving voltage of additional amplitude may be desirable in order to overcome the mechanical intertia within a system when the pawl 14 is in a stationary or moving slowly prior to the application of reverse torque.

Figure 3:
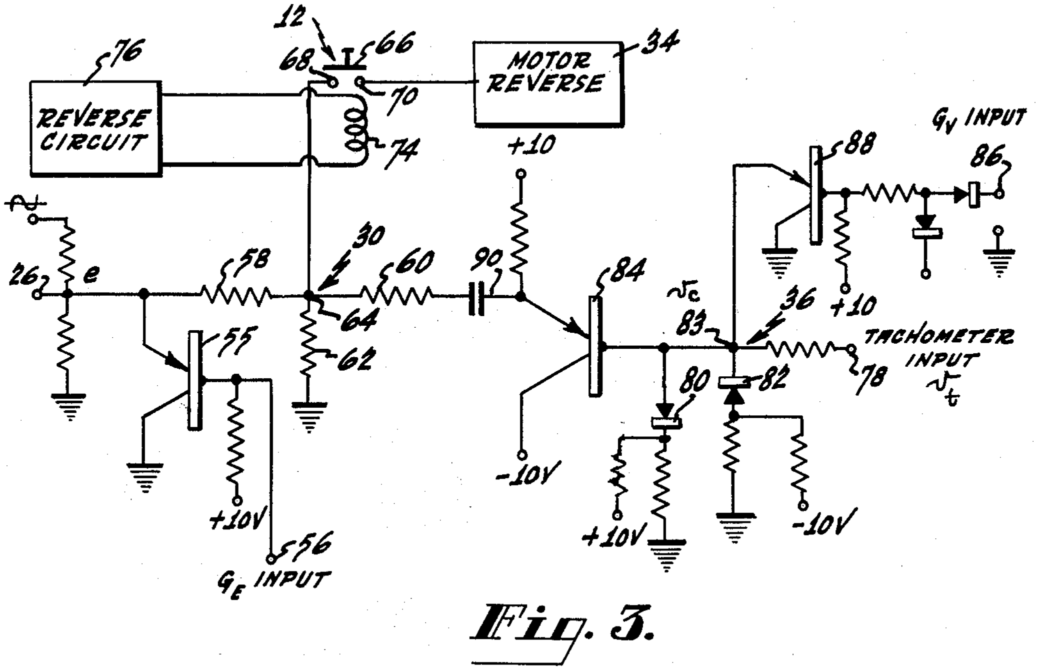
FIGURE 3 is a schematic diagram illustrating in greater detail some of the features involved in the present invention.

Referring particularly to FIGURE 3, a detailed schematic diagram including the main circuits of FIGURE 2 is illustrated. The driving voltage is applied from the input terminal 26 to the emitter of a transistor 55, which may be the circuit incorporated in the block 28 of FIGURE 2. A gating signal is applied from a terminal 56 to the base of the transistor 55. The terminal 56 may be from the gate generator 54 (FIGURE 2). The circuit parameters associated with the transistor 55 are such that it is either conducting or non-conducting. The output signal from transistor 55 is applied to a summing circuit 30 which includes resistors 58, 60 and 62. The voltage at the point 64 of the summing circuit 30 is applied to the servo motor 34 when a movable arm 66 of the relay 72 is closed to engage a pair of contacts 68 and 70. The coil 74 of the relay 72 is energized by a signal from a circuit designated as a reverse circuit 76. The reverse circuit 76 may be a form of zero error voltage detector which may, for example, become operative when a pawl 14 (FIGURE 1*a*) is disposed between two selected teeth 16 and 18 of rack 20. The pawl may be in this position as a result of the first and second servo operations previously discussed.

A source of velocity voltage, for example from the tachometer 32 of FIGURE 2, is applied from an input terminal 78 to the clipping circuit 36. The clipping circuit includes a pair of diodes 80 and 82. The output voltage from the clipping circuit at the point 83 is applied to the base of a transistor 84.

A gating signal, which may be from the gate generator 46 of FIGURE 2, is applied from an input terminal 86 to the base of a transistor 88. The transistor 88 is either conducting or non-conducting dependent upon the signal applied to the terminal 86. A gating signal at the terminal 86 applied to the base thereof causes the transistor 88 to conduct thereby providing a low impedance path to ground for the velocity voltage applied to the input terminal 78. At the end of the gating signal, the transistor 88 becomes non-conducting thereby permitting the velocity voltage at the input terminal 78 to be applied to the clipping circuit 36.

The output voltage representing the applied velocity voltage is applied from the emitter of the transistor 84 through a capacitor 90 to the summing circuit 30. The phase relationship between the voltage applied to the summing circuit from the input terminal 26 and from the velocity voltage are opposite.

It is seen when a gating signal of a predetermined duration is applied to the input terminal 86 that only the driving voltage at the input terminal 28 will be effective to drive the motor 34. Consequently, maximum acceleration for the motor 34 is provided during the gating signal period. At the end of the gating period, the transistor 88 becomes non-conducting to provide a high impedance path thereby permitting the velocity voltage from the terminal 78 to pass through the transistor 84 and be combined with the driving voltage from the input terminal 26 in the summing circuit 30 to provide a damping effect.

In practicing the present invention, a system can generally be designed so that the velocity voltage providing a damping effect is applied after the maximum acceleration of a pawl has been reached to minimize the likelihood of mechanical damage to the pawl or other associated mechanical parts when the pawl strikes against the positioning rack. The velocity signal is limited after maximum acceleration is reached in such a way that approximately constant speed of the pawl is achieved. During the "settling down" period of the pawl, the velocity voltage at the terminal 78 drops below the voltage level required to operate the diodes 80 and 82 and is not limited by the clipping circuit 36 since the diodes 80 and 82 become non-conducting. Because the velocity voltage is not limited by the diodes, the damping voltage is not limited and final position of a pawl or carriage driving by a motor is reached in a minimum of time.

Figure 4:
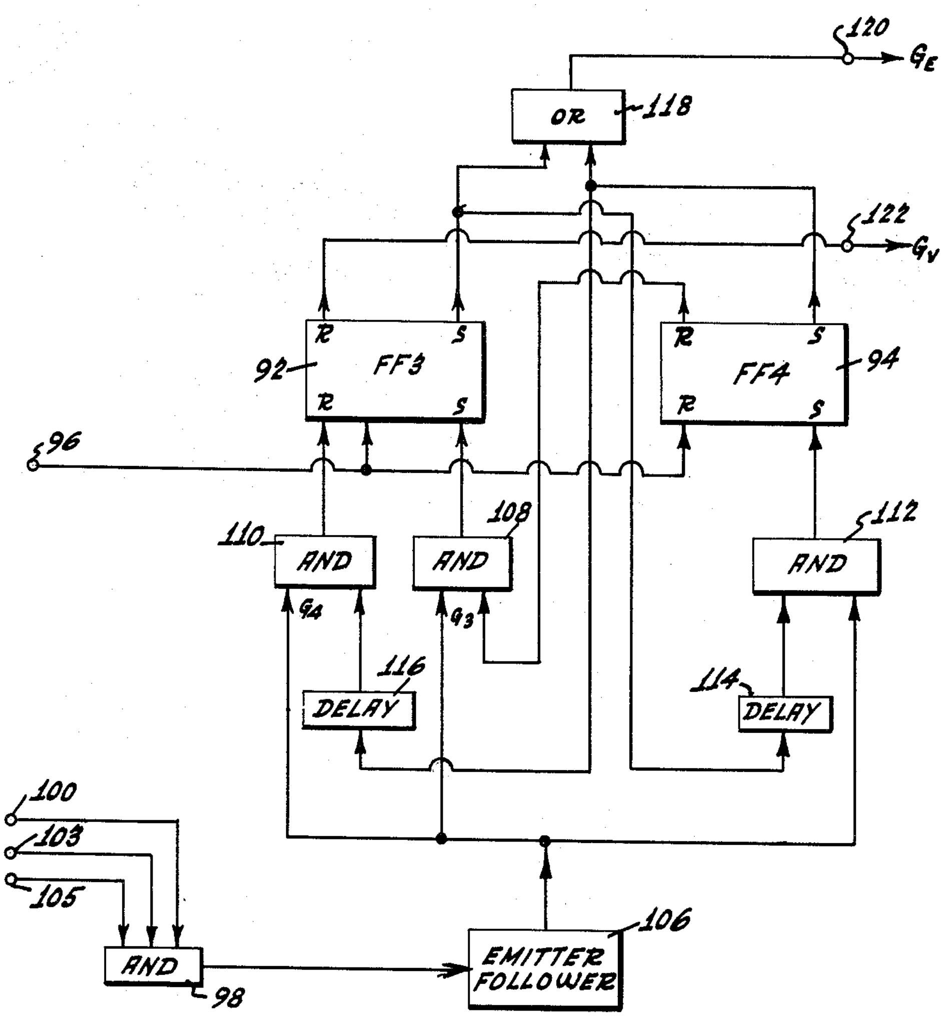
FIGURE 4 is a block diagram illustrating some of the logical functions which may be incorporated into the present invention.

Referring particularly to FIGURE 4, there is illustrated a reverse torque switching system synchronization logic diagram. The purpose of this circuit is to generate gating signals related to the driving voltage and the velocity voltage. The driving gating signal is used to synchronize the application of the reverse torque to the servo with the peak value of the line voltage in order to speed servo response. The velocity gating signal is used to inhibit the application of the velocity signal during the rack moving cycle and during the early part of the reverse torque phase. This allows undampened acceleration of a carriage so that the carriage can follow the rack during the rack's moving cycle and so that the response time can be minimized during the reverse torque phase.

At the start of the servo cycle, flip flops 92 and 94 are cleared by a signal applied to a terminal 96. This signal may be from a change of address amplifier in a positioning system designating that a new address must be sought by the carriage. No change in the flip flops 92 and 94 can occur until a signal is received from an AND gate circuit 98. Various other circuits associated with a computer may be connected to terminals 100, 103 and 104. For example, one of the terminals 100 may be employed to assure that no signal is developed at the output of the AND gate 98 during the forward or closed loop cycle of the entire positioning operation. These operations may be the first and second servo operations previously discussed. The second terminal 103 may be connected to receive a signal indicating that a relay or other means has been operated to actuate the pawl mechanism and to cause the pawl 14 to be in an extended position. With these various conditions present, the system is now ready to provide the third or a final positioning operation involving moving the pawl against a selected tooth and holding it at that position.

As soon as the third or reverse torque phase operation commences, a continuous series of pulses is applied through the AND gate 98 from the input terminal 105. The output signal from the AND gate 98 is applied through an emitter follower 106 to the input circuits of gate circuits 108, 110 and 112. When the flip flops 92 and 94 are initially reset, their outputs designated S are at the inhibiting levels. Thus, the gate circuit 110 is inhibited by the S output of the flip flop 94 and the gate 112 is inhibited by the S output of flip flop 92. Gate circuit 108, which receives the conditioning level from the R output of the flip flop 94 is the only one of the three gate circuits 108, 110 and 112 which passes the first pulse from the gate circuit 98. This first pulse, passed by the gate circuit 108, sets the flip flop 92.

A time delay, provided by a delay circuit 114, between the S output of the flip flop 92 and the inhibited input of the gate circuit 112 insures that the inhibited level is maintained at gate circuit 112 during the first pulse period. Thus, the second pulse from the AND gate 98 passes through the gate circuit 112 and sets the flip flop 94. The second pulse also passes through a gate circuit 108, but has no effect on the flip flop 92 which is already set.

A time delay, provided by a delay circuit 116, during the time that the flip flop 94 is in its S state, insures that the inhibited level is maintained at the gate circuit 110 during the second pulse period.

When the third pulse passes through the gate circuit 98, the inhibited level is gone from the gate circuit 110. At the same time, an inhibited level is present at the gate circuit 108, hence the flip flop 94 is set. Thus the third pulse resets the flip flop 92. This completes the operation of the synchronization circuit until such time as a reset signal appears at the terminal 96, since succeeding pulses passed by the gate circuit 98 have no further affect on the flip flops 92 and 94.

To summarize the operation of the synchronization circuit, the two flip flops 92 and 94 are initially reset. The first pulse through the gate 98 sets the flip flop 92. The second pulse sets the flip flop 94. The third pulse resets the flip flop 92. The driving voltage gating signal is developed at the output terminal 120 from an OR circuit 118 which is connected to the S outputs of the two flip flops 92 and 94. Thus, the gating signal appears when the flip flop 92 is set by the first pulse and continues until the two flip flops 92 and 94 are reset by a signal applied to the terminal 96. The pulses applied to the terminal 105 coincide with the peaks of the reverse torque signal voltage so that the reverse torque is applied to drive the servo motor 34 (FIGURE 2) just at it reaches its peak value.

The velocity gating signal applied to the output terminal 122 is taken from the R output of the flip flop 92. This signal may be initially zero volts and drops to minus 10 volts when the flip flop 92 is set by the first pulse from the gate circuit 98. This voltage returns to zero volts when the flip flop 92 is reset by the third pulse from the gate circuit 98. Since there are two pulses for each cycle of the reverse torque signal, the velocity gating signal is negative for one cycle of the signal. This negative gating signal removes the velocity signal voltage for one cycle of the reverse torque signal. The timing of the driving and velocity signals is illustrated in FIGURES 1*b* and 1*c*.

It is seen that the present invention has provided means for attaining fast final positioning of a carriage over a selected portion of a drum. This has been accomplished with a servo motor of low carrier frequency type by providing a quick initial acceleration of a driving servo motor to reach maximum speed, synchronizing the servo motor from the line carrier frequency, and then providing a damping signal after a predetermined time interval. All this is accomplished without slowing down the moving mechanism. Once the pawl has hit the rack, high damping is provided by using an amplified and clipped velocity signal thereby achieving a quick "settling down" of the carriage and its associated mechanical parts.

What is claimed is:

1. In combination with a servo system for positioning a magnetic head carrying carriage with respect to a toothed rack, an extendible and retractable pawl movable mounted to said carriage and disposed to engage one of the teeth of said rack when in an extended position and to be free of said rack when in a retracted position, a motor for urging said pawl against one of said teeth when said pawl is in an extended position, a source of driving voltage for driving said motor, a tachometer associated with said motor to produce a velocity voltage representative of the velocity of said carriage, means for applying said driving voltage to urge said pawl against a selected tooth of said rack when said pawl is in an extended position to maintain said carriage in a fixed position relative to said rack, a gating circuit, means for applying said velocity voltage through said gating circuit to said motor to provide damping of the movement of said carriage during the final stage of a positioning operation, a gate generator circuit to produce gating signals, and means for applying said gating signals to said gating circuit to inhibit the application of said velocity voltage to said motor for a predetermined time period to minimize the damping of said carriage movement during said predetermined time period.

2. In combination with a servo system for positioning a magnetic head carrying carriage with respect to a toothed rack, an extendible and retractable pawl movably mounted to said carriage and disposed to engage one of the teeth of said rack when in an extended position and to be free of said rack when in a retracted position, a motor for urging said pawl against one of said teeth when said pawl is in an extended position, a source of driving voltage for driving said motor, a tachometer associated with said motor to produce a velocity voltage representative of the velocity of said carriage, means for applying said driving voltage to urge said pawl against a selected tooth of said rack when said pawl is in an extended position to maintain said carriage in a fixed position relative to said rack, a limiter circuit, means for applying said velocity voltage to said limiter circuit, a gating circuit, means for applying the output voltage from said limiter circuit through said gating circuit to said motor to provide damping of the movement of said carriage during the final stage of a positioning operation, a gate generator circuit to produce gating signals, and means for applying said gating signals to said gating circuit to inhibit the application of said velocity voltage to said motor for a predetermined time period to minimize the damping of said carriage movement during said predetermined time period.

3. In combination with a servo system for positioning a magnetic head carrying carriage with respect to a toothed rack, an extendible and retractable pawl movably mounted to said carriage and disposed to engage one of the teeth of said rack when in an extended position and to be free of said rack when in a retracted position, a motor for urging said pawl against one of said teeth when said pawl is in an extended position, a source of driving voltage for driving said motor, a tachometer associated with said motor to produce a velocity voltage representative of the velocity of said carriage, means for applying said driving voltage to urge said pawl against a selected tooth of said rack when said pawl is in an extended position to maintain said carriage in a fixed position relative to said rack, a limiter circuit, means for applying said velocity voltage to said limiter circuit, a gating circuit, means for applying the output voltage from said limiter circuit through said gating circuit to said motor to provide damping of the movement of said carriage during the final stage of a positioning operation, a gate generator circuit to produce gating signals, means for applying said gating signals to said gating circuit to inhibit the application of said velocity voltage to said motor for a predetermined time period to minimize the damping of the movement of said carriage during said predetermined time period, and means for increasing the amplitude of said driving voltage for a portion of said predetermined time period to permit maximum acceleration of said carriage.

4. The invention as set forth in claim 3 wherein said last named means includes a second gating circuit and a second gate generator for generating second gating signals, means for applying said second gating signals to said second gate generator, said driving voltage being applied to said motor through said second gating circuit with the amplitude of said driving voltage applied to said motor being amplified during the periods of said gating signals.

5. The invention as set forth in claim 4 wherein said velocity voltage is unlimited during the final stage of said positioning operation.

References Cited in the file of this patent

UNITED STATES PATENTS

| | | |
|---|---|---|
| 2,726,359 | Ray | Dec. 6, 1955 |
| 2,848,677 | Stockwell | Aug. 19, 1958 |
| 2,913,654 | Clark | Nov. 17, 1959 |
| 2,940,026 | Rague | June 7, 1960 |